United States Patent
Paul et al.

(10) Patent No.: US 12,526,262 B2
(45) Date of Patent: Jan. 13, 2026

(54) ACCESS TOKEN CONVERSION

(71) Applicant: Walmart Apollo, LLC, Bentonville, AR (US)

(72) Inventors: Abhishek Paul, Union City, CA (US); Dipanjan Bandyopadhyay, Fremont, CA (US); Ibrahim Mustafa, San Francisco, CA (US); Prem Kumar Mani, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 765 days.

(21) Appl. No.: 17/516,410

(22) Filed: Nov. 1, 2021

(65) Prior Publication Data

US 2023/0136230 A1    May 4, 2023

(51) Int. Cl.
*H04L 9/40* (2022.01)
*G06F 9/54* (2006.01)
*G06Q 20/36* (2012.01)
*G06Q 20/40* (2012.01)

(52) U.S. Cl.
CPC ............. *H04L 63/08* (2013.01); *G06F 9/547* (2013.01); *G06Q 20/3674* (2013.01); *G06Q 20/4014* (2013.01); *H04L 63/0815* (2013.01); *H04L 63/0853* (2013.01); *H04L 63/0884* (2013.01); *H04L 63/20* (2013.01); *H04L 63/0807* (2013.01); *H04L 63/10* (2013.01)

(58) Field of Classification Search
CPC . H04L 63/08; H04L 63/0815; H04L 63/0853; H04L 63/0884; H04L 63/20; H04L 63/0807; H04L 63/10; G06F 9/547; G06Q 20/3674; G06Q 20/4014
See application file for complete search history.

(56) References Cited

U.S. PATENT DOCUMENTS

| | | | |
|---|---|---|---|
| 9,282,088 B2 | 3/2016 | Chin | |
| 11,805,127 B1 * | 10/2023 | Sundar | .................. H04L 63/102 |
| 2006/0204051 A1 | 9/2006 | Holland | |

(Continued)

OTHER PUBLICATIONS

Chowhan, Rahul et al.; "Password-Less Authentication: Methods for User Verification and Identification to Login Securely Over Remote Sites"; Machine Learning and Cognitive Science Applications in Cyber Security; IGI Global; Jan. 2019; pp. 190-212.

(Continued)

*Primary Examiner* — Cheng-Feng Huang
(74) *Attorney, Agent, or Firm* — Foley IP Law, PLLC

(57) ABSTRACT

In some embodiments, apparatuses and methods are provided herein useful for access token conversion. The system comprises a first application programming interface (API) backend using a first authentication service based on a first tokenization protocol and a second API backend using a second authentication service based on a second tokenization protocol. The second authentication service is configured to receive from, a user device, a call to the second API backend with a first token associated with the first authentication service, convert the first token to a first converted token based on the second tokenization protocol, and forward the first converted token to the user device for use in subsequent calls to the second API backend.

20 Claims, 11 Drawing Sheets

(56) References Cited

U.S. PATENT DOCUMENTS

| | | | |
|---|---|---|---|
| 2008/0046715 A1* | 2/2008 | Balazs | H04L 63/0815 |
| | | | 713/152 |
| 2012/0143752 A1 | 6/2012 | Wong et al. | |
| 2014/0059088 A1* | 2/2014 | Mattsson | G06F 16/258 |
| | | | 707/803 |
| 2015/0127547 A1* | 5/2015 | Powell | G06Q 20/4016 |
| | | | 705/67 |
| 2015/0244706 A1* | 8/2015 | Grajek | H04L 63/0815 |
| | | | 726/6 |
| 2015/0302398 A1* | 10/2015 | Desai | G06Q 20/322 |
| | | | 705/41 |
| 2015/0334099 A1 | 11/2015 | Zhang | |
| 2016/0142409 A1 | 5/2016 | Frei | |
| 2016/0283925 A1 | 9/2016 | Lavu | |
| 2017/0170963 A1 | 6/2017 | Xu | |
| 2018/0075231 A1 | 3/2018 | Subramanian et al. | |
| 2019/0386831 A1 | 12/2019 | Jamkhedkar et al. | |
| 2020/0296082 A1 | 9/2020 | Killoran, Jr. | |
| 2020/0304542 A1 | 9/2020 | Ilincic | |

OTHER PUBLICATIONS

Okta; "Unlocking Omni-channel With Unified Customer Identity"; https://www.okta.com/sites/default/files/pdf/Unlocking%20Omni-channel%20With%20Unified%20Customer%20Identity%20_0.pdf; Available at least as early as Aug. 2021; 12 pages.

Tantillo, Davide et al.; "M2M authentication and authorization with OAuth 2.0 and OpenID Connect"; https://blog.mia-platform.eu/en/m2m-authentication-and-authorization-with-oauth-2.0-and-openid-connect; Published May 4, 2021; 12 pages.

Kari Rodriquez, PCT International Search Report and Written Opinion, mailed Mar. 1, 2023, in connection with International Application No. PCT/US2022/48512, 28 pages.

* cited by examiner

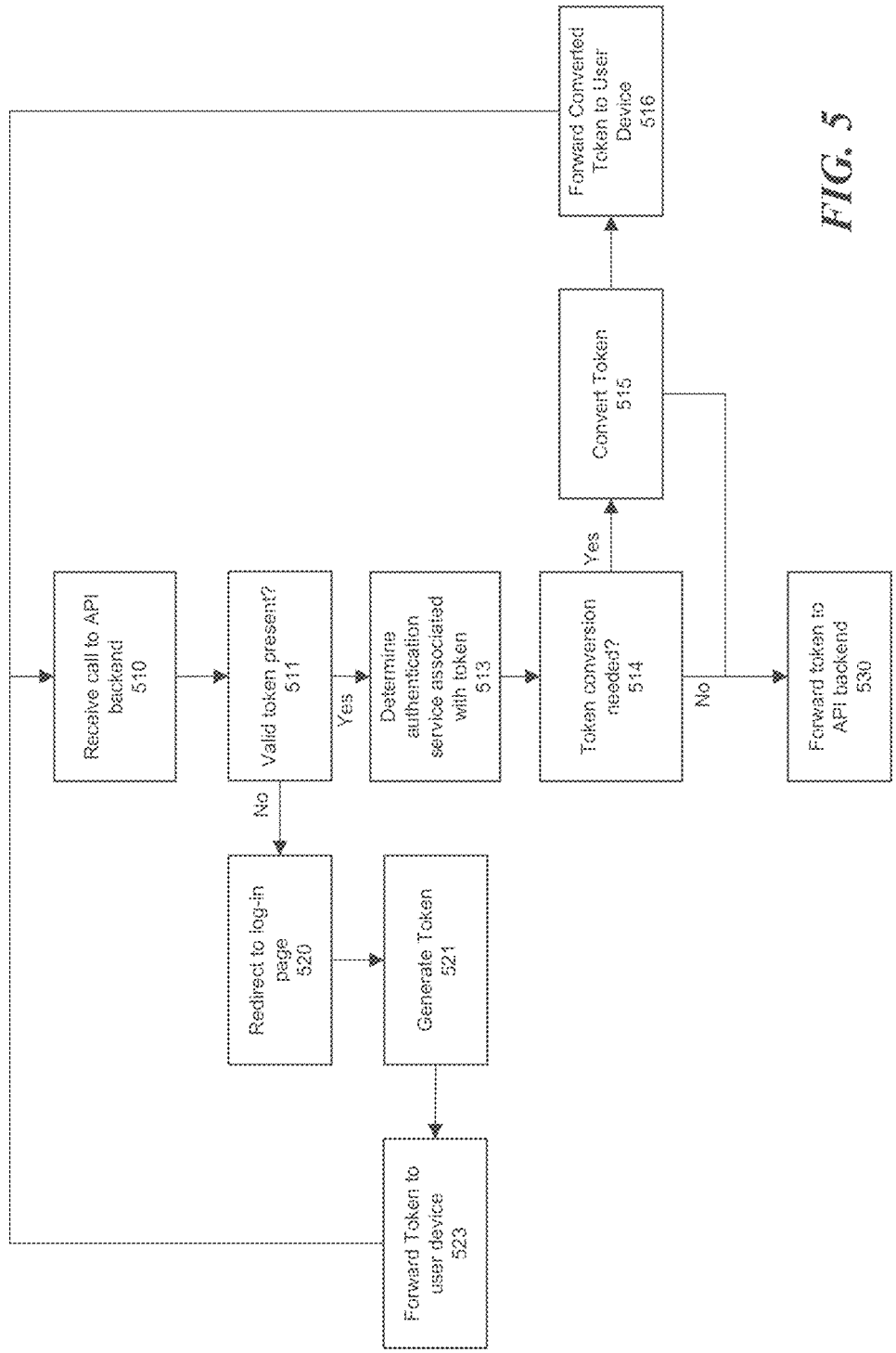

ACCESS TOKEN CONVERSION

TECHNICAL FIELD

This invention relates generally to authentication and tokenization in computer network communications

BACKGROUND

Tokenization, in the context of data security, is the process of substituting a sensitive data element with a non-sensitive equivalent, referred to as a token, that has no extrinsic or exploitable meaning or value. The token is a reference (i.e. identifier) that maps back to the sensitive data through a tokenization system. The mapping from original data to a token uses methods that render tokens infeasible to reverse in the absence of the tokenization system.

BRIEF DESCRIPTION OF THE DRAWINGS

Disclosed herein are embodiments of systems and methods for providing authentication and tokenization. This description includes drawings, wherein:

FIG. 5 comprises a flow diagram of a token conversion method in accordance with some embodiments;

Figure 1:
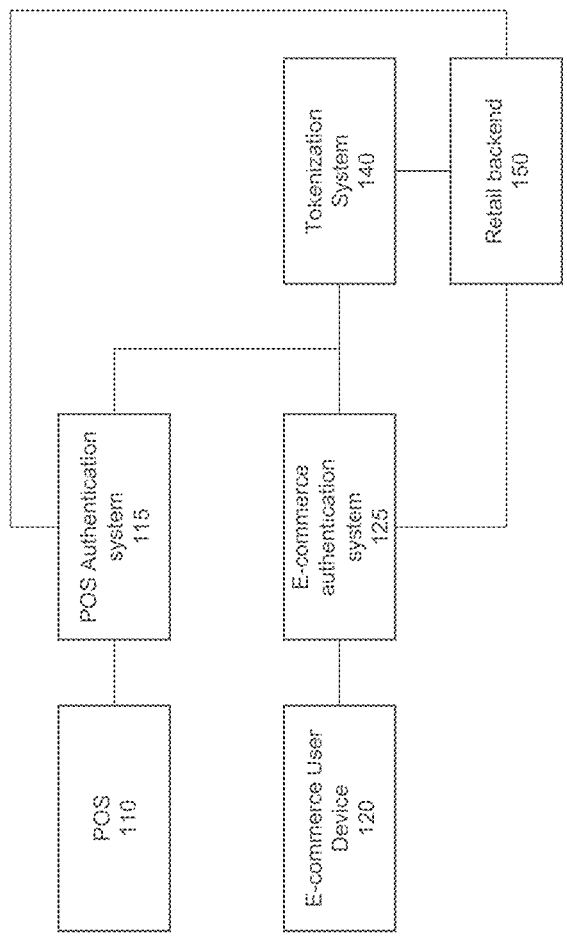
FIG. 1 comprises a block diagram of a multichannel authentication and tokenization system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices, and methods are provided for multichannel authentication and tokenization. In some embodiments, a system for multichannel authentication comprises a first authentication system serving a plurality of in-store point of sale terminals and implementing a physical channel authentication policy and a second authentication system serving a plurality of user devices accessing an e-commerce service and implementing an e-commerce channel authentication policy, and a tokenization system. The tokenization system being configured to generate a first token in response to receiving a first user credential from an in-store point of sale terminal via the first authentication system, generate a second token in response to receiving a second user credential from a user device via the second authentication system, and forward the first token and the second token to the retailer backend system, wherein the first token and the second token are generated based on the same tokenization protocol.

In some embodiments, a multichannel authentication system described herein serves both authentication and authorization use cases. In some embodiments, in-store point of sale systems and/or store self-service desks use the same multichannel authentication service as online users of an e-commerce site associated with the same retailer. In some embodiments, the multichannel authentication service is configured to support step-up authentication use cases. In some embodiments, the multichannel authentication service simplifies the software architecture of the overall system by only handling authentication and authorization functionalities for users which results in fewer production issues, easier support and management of the functionalities, improved latency, and easier scaling. In some embodiments, the multichannel authentication service further prevents bot attacks with credential stuffing.

In some embodiments, the multichannel authentication and authorization system is designed based upon the current industry standards. In some embodiments, the system allows a user to use a single sign-on for a retailer website (e.g. Sam's Club website) and other third-party sites (e.g. Instacart) that are compliant with OpenID and oAuth2. In some embodiments, the system utilizes building blocks such as Microsoft's B2C Azure combined with the retailer's data repository. In some embodiments, the user ID and passwords are stored in the internal database of the retailer. In some embodiments, the multichannel authentication system may be omnichannel, scalable, available, and more secure. In some embodiments, the multichannel authentication system may be used with password-less logins, third-party authenticators (e.g. Google, Microsoft), and Fast Identity Online (FIDO) authentication.

In some embodiments, the authentication system allows members of a retailer to access retailer-specific offerings of items and rewards (e.g. cashpoints). In some embodiments, when a member of the retailer goes to a physical store, an access token may be generated by the same system as the digital channels. The same authentication and authorization solution serves the stores as well as the digital channels like Desktop/Mweb and Mobile App. In some embodiments, backend systems (e.g. check out, cash rewards, etc.)

acknowledge the access token in a channel-agnostic way; these systems do not differentiate whether the user credential was received and authorized via a digital channel (e.g. Desktop/Mweb, Apps) or physical channel (e.g. brick-and-mortar stores). As used herein, a retailer generally refers to an entity that offers goods and services for sale to customers and may include retail, warehouse, and wholesale sellers.

Referring now to FIG. 1, a system for multichannel authentication and tokenization is shown. The system includes a POS authentication system 115 coupled to a plurality of in-store POSs 110. In some embodiments, an in-store POS may comprise a staffed or a self-service checkout station configured to identify products brought to the POS and receive payment for the products. In some embodiments, an in-store POS may include one or more components such as an optical scanner, a weight scale, a pin entry pad, a card reader, a display screen, a camera, a bill acceptor, a receipt printer, etc. In some embodiments, the POS authentication system 115 may be referred to as a physical channel authentication system configured to perform authentication for user credentials received at one or more physical, brick-and-mortar stores. In some embodiments, the POS authentication system may be part of a private network comprising the plurality of in-store point of sale terminals. In some embodiments, the POS authentication system 115 may serve a single store location or may serve a plurality of geographically distributed stores and POS systems. In some embodiments, the POS authentication system 115 may be further configured to serve a plurality of in-store customer service terminals. In some embodiments, the POS authentication system 115 may implement a physical channel authentication policy. In some embodiments, the authentication policy may specify the types of information (e.g. member ID, membership card optical scan, membership card magnetic stripe swipe, membership card chip insert, user name, PIN, password, credit card swipe, government ID information, biometrics, token tier, token age, etc.) required to perform the authentication. In some embodiments, the authentication policy may include requirements for one or more tiers of step-up authentication and tokenization. For example, member ID may be sufficient for authentication for a purchase transaction, but a PIN or a second form of ID (e.g. government ID, name on credit card) may be required for award redemption transactions. In some embodiments, the POS authentication system 115 may access a user identification database to verify and authenticate the received user credential. In some embodiments, the authentication system may cause the authentication policy requirements associated with the requested transaction/information to be displayed to the user via the POS or a user device. Once the user credential is authenticated by the POS authentication system 115, the information is passed to the tokenization system 140 to generate a token for the user credential. The tokenization system 140 may use a tokenization protocol to associate an access token with the user credential and store the association a user identification database and/or a tokenization database accessible by the POS authentication system 115, the e-commerce authentication system 125, and/or the retail backend. The token is then forwarded back to the POS 110 for use in subsequent communications with the retail backend. For example, for other messages involving the same user, the POS may include the token in the call to the retail backend instead of resending the user credential.

The e-commerce authentication system 125 is coupled to a plurality of user devices 120 accessing an e-commerce service. In some embodiments, the e-commerce authentication system may 116 also be referred to as a digital channel authentication system configured to perform authentication for user credentials received via the Internet. The user devices 120 may comprise a processor-based device (e.g. personal computer, smartphone, tablet computer, wearable device, IoT device, etc.) accessing an e-commerce system via a website and/or an application. In some embodiments, the e-commerce authentication system 125 may be part of the application programming interface (API) backend of the e-commerce service. In some embodiments, the e-commerce authentication system 125 may implement an e-commerce authentication policy. In some embodiments, the authentication policy may specify the types of information (e.g. user ID, password, two-factor authentication, user device IP address, token tier, token age) required to perform the authentication. In some embodiments, the authentication policy may include requirements for one or more tiers of step-up authentication and tokenization. For example, a keep-me-signed-in token issued a month ago may be sufficient to browse the catalog and view the virtual cart, but the system may require a same-day login to submit a purchase order. In another example, two-factor authentication may be required when a user is accessing the e-commerce service from a new IP. In some embodiments, the e-commerce authentication system 125 may access a user identification database to verify and authenticate the received user credential. Once the user credential is authenticated by the e-commerce authentication system 125, the information is passed to the tokenization system 140 to generate a token for the user credential. The tokenization system 140 may use a tokenization protocol to associate an access token with the user credential and store the association in the user identification database and/or a tokenization database accessible by the POS authentication system 115, the e-commerce authentication system 125, and/or the retailer backend 150. The token is then forwarded back to the user device 120 for use in subsequent communications with the retail backend. For example, in subsequent calls to the retailer backend 150, the user device may include the token in the call instead of resending the user credential.

While the POS authentication system 115, the e-commerce authentication system 125, and the tokenization system 140 are shown separately in FIG. 1, in some embodiments, one or more of these systems may be implemented on the same one or more processor-based devices. In some embodiments, the tokenization system 140 may be implemented as components/modules of the POS authentication system 115 and the e-commerce authentication system 125 that use the same tokenization protocol and authentication service to generate channel-agnostic tokens.

In some embodiments, the POS authentication system 115 and the e-commerce authentication system 125 use the same authentication service (e.g. Microsoft Azure B2C, Oracle ATG, etc.). In some embodiments, the POS authentication system 115 and the e-commerce authentication system 125 implement different authentication policies for user credential authentication. However, the tokens generated based on the authentications performed by the two authentication systems may be indistinguishable by the retailer backend 150, and the retailer backend 150 handles the tokens in a channel-agnostic way. That is, the retailer backend 150 would not need to know which channel the received token originated. In some embodiments, the retailer backend 150 may comprise systems for supporting in-store POS functionalities and/or e-commerce functionalities such as a checkout system, a membership service system, a digital wallet system, an order tracking system, a rewards system, etc. In some embodiments, tokens generated by the POS authentication system 115 and the e-commerce authentication system 125 for the same user account are handled identically and/or indistinguishable by the retailer backend 150. In some embodiments, the tokens from both channels are stored in a single tokenization database without indication of where the token originated. For example, when the retailer backend 150 receives a request with a token, it can query the same database and retrieve the same user information associated with the token regardless of the origin of the token. In some embodiments, components of the retailer backend 150 may also communicate with each other using the tokens without knowledge/distinction on which channel originated the token.

In some embodiments, one or more components of the retailer backend 150 may be configured to recognize only tokens in the format of another authentication service. A token conversion system may be added to the system in FIG. 1 that converts between the tokens generated by the tokenization system 140 and the token format recognized by the components of the retail backend system. Further details of token conversion systems and methods are described with reference to FIGS. 4-7 herein.

In some embodiments, the system may comprise additional authentication systems implementing different authentication policies that share the same tokenization system and protocol. For example, the system may further include a third authentication system for authenticating user credentials received via a customer service contact center or an in-store customer service authentication system, etc. In some embodiments, the retailer backend 150 need not be reconfigured to perform token-based communication with additional channels as each channel uses the same tokenization system and protocol regardless of the authentication policies implemented for each channel.

Figure 2:
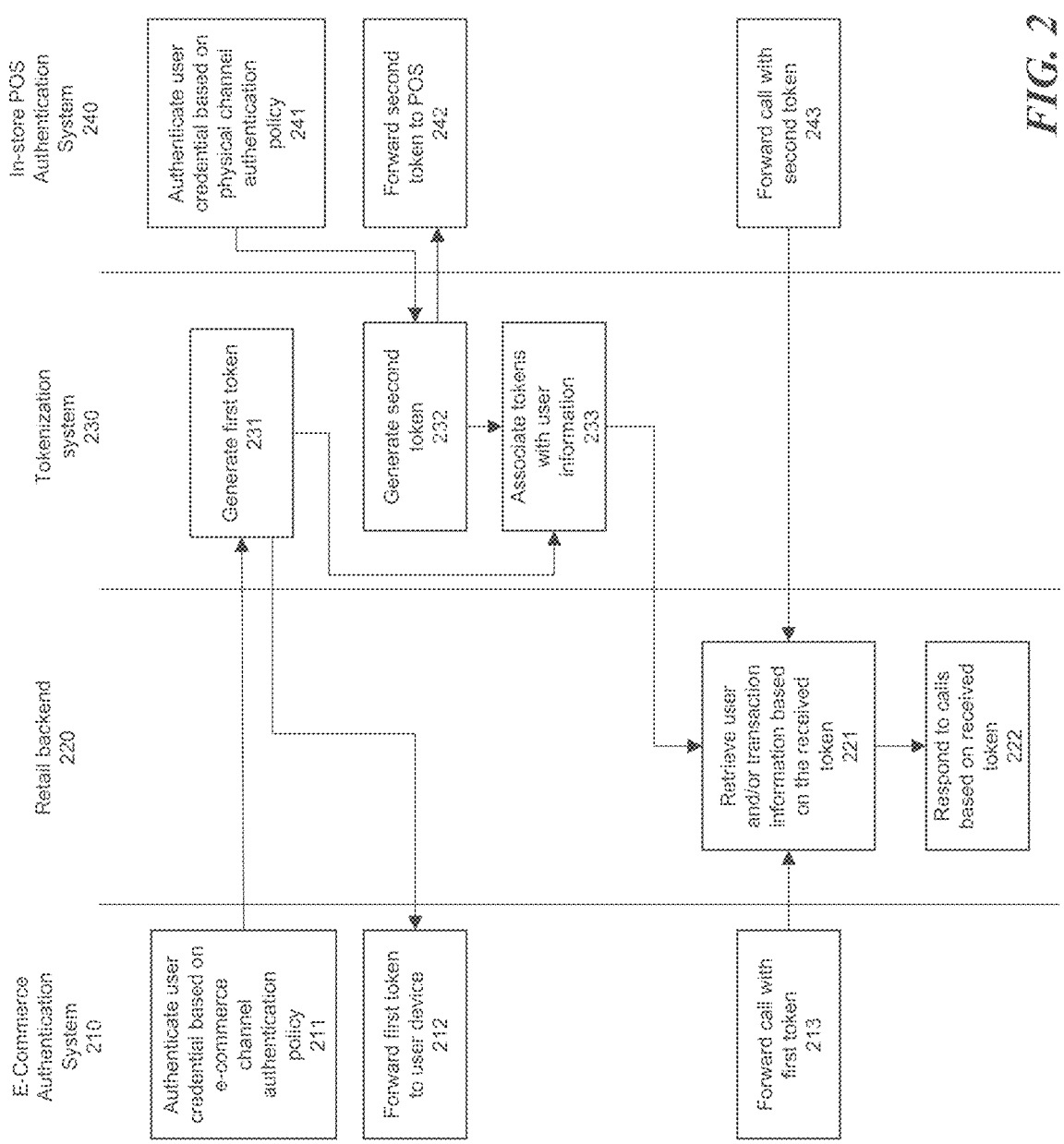
FIG. 2 comprises a flow diagram of a multichannel authentication and tokenization process in accordance with some embodiments.

Referring now to FIG. 2, a method for providing multi-channel authentication is shown. In some embodiments, the steps shown in FIG. 2 may be performed by a processor-based device such as a control circuit executing a set of computer-readable instructions stored on a computer-readable memory. In some embodiments, one or more steps of FIG. 2 may be performed by one or more components of the system described with reference to FIG. 1 and/or the computer system described with reference to FIG. 8.

The process shown in FIG. 2 involves an e-commerce authentication system 210, a retailer backend 220, a tokenization system 230, and an in-store POS authentication system 240. In some embodiments, the e-commerce authentication system 210, the retailer backend 220, the tokenization system 230, and the in-store POS authentication system 240 may comprise the e-commerce authentication system 125, the retailer backend 150, the tokenization system 140, and the in-store POS authentication system 115 described with reference to FIG. 1 respectively. While an e-commerce authentication system 210 and an in-store POS authentication system 240 are referenced in FIG. 2, in some embodiments, the process may be used for any two or more authentication systems implementing different authentication policies.

In step 211, the e-commerce authentication system 210 authenticates user credentials received from a user device based on an e-commerce channel authentication policy. In some embodiments, the authentication policy may specify the types of information (e.g. user ID, password, two-factor authentication, user device IP address, token tier, token age) required to perform the authentication. In some embodiments, the authentication policy may include requirements for one or more tiers of step-up authentication and tokenization. In some embodiments, if the requested call or transaction requires a step-up token according to the authentication policy, the first token may comprise a step-up token. In step 231, the tokenization system 230 receives the authenticated credential and generates a first token. In step 212, the first token is forwarded back to the user device for use in subsequent communications with the retailer backend 220. In some embodiments, the first token may be forwarded back to the user device via the retailer backend 220.

In step 241, the POS authentication system 240 authenticates user credentials based on a physical channel authentication policy. In some embodiments, the authentication policy may specify the types of information (e.g. member ID, membership card optical scan, membership card magnetic stripe swipe, membership card chip insert, user name, PIN, password, credit card swipe, government ID information, biometrics, token tier, token age, etc.) required to perform the authentication. In some embodiments, the authentication policy may include requirements for one or more tiers of step-up authentication and tokenization. In step 232, the tokenization system 230 receives the authenticated credential and generates a second token. In some embodiments, if the requested call or transaction requires a step-up token according to the authentication policy, the second token may comprise a step-up token. In step 242, the second token is forwarded back to the POS for use in subsequent communications with the retailer backend 220. In some embodiments, the second token may be forwarded back to the POS via the retailer backend 220.

In step 233, the first and second tokens are associated with the respective user information in a user database and/or a tokenization database accessible by the retailer backend 220. In step 213, the e-commerce authentication system 210 receives a call including the first token, and forwards the call to the retail backend. In some embodiments, the e-commerce authentication system 210 may first validate the token based on the tokenization protocol and/or the tokenization database prior to forwarding the call. In step 243, the POS authentication system 240 receives a call including the second token and forwards the call to the retailer backend 220. In some embodiments, the POS authentication system 240 may first validate the token based on the tokenization protocol and/or tokenization database prior to forwarding the call.

In step 221, regardless of whether the token is received from the digital or physical channel, the retailer backend 220 may use the tokens to query the same databases and/or services to determine user and/or transaction information needed to respond to the call in a channel-agnostic way. In step 222, the system responds to the calls based on the received token.

In some embodiments, a system may simultaneously execute multiple instances of the steps shown in FIG. 5 to perform authentication and token conversion for a plurality of calls from a plurality of user devices and POSs. In some embodiments, the system may execute a similar process for additional authentication systems implementing different authentication policies. Tokens generated based on authentications performed by the different systems may generate tokens based on the same protocol/service in the same format and be channel-agnostic from the point of view of the retailer backend 220.

Figure 3A:
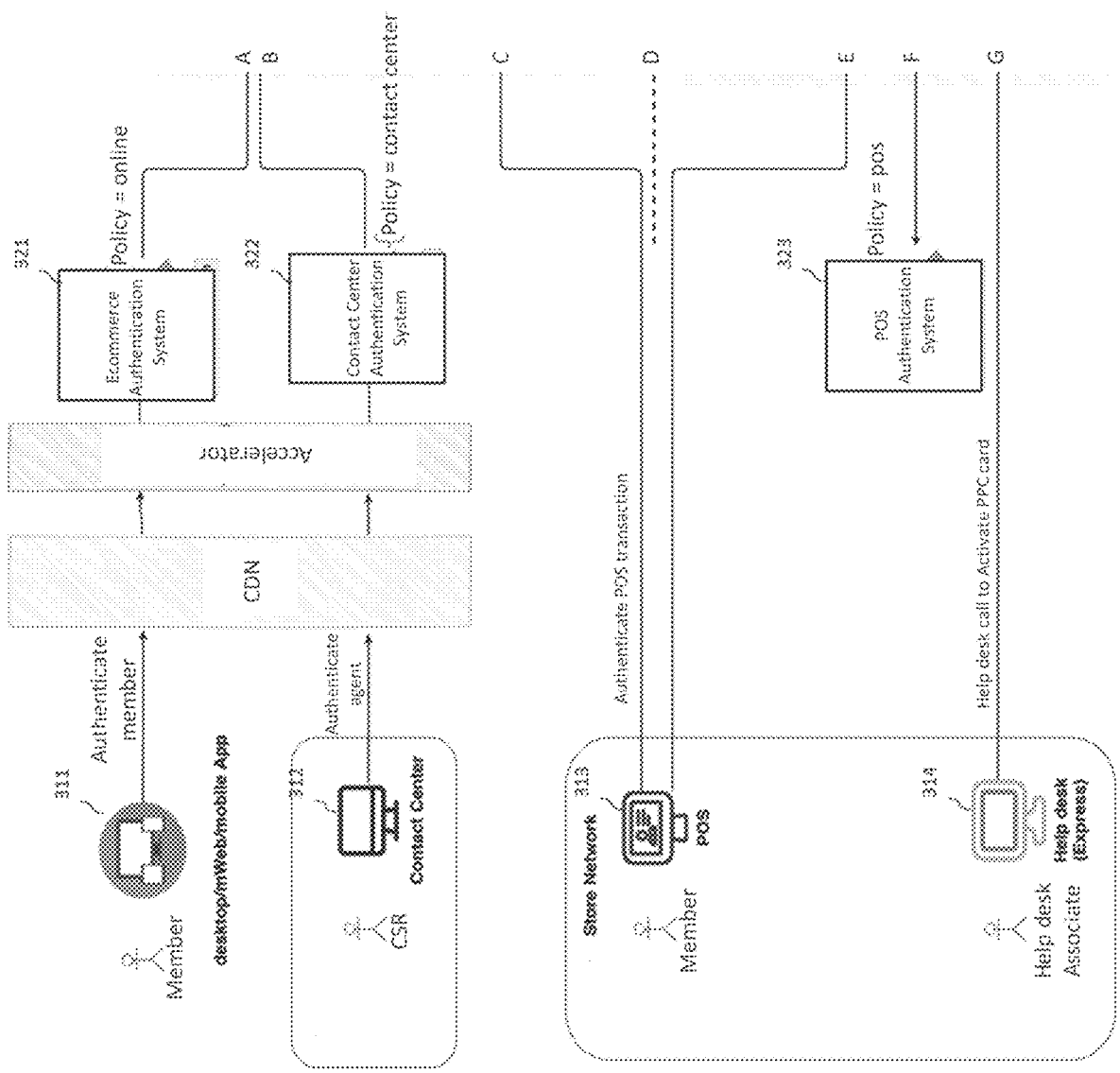
FIGS. 3A and 3B comprises a system diagram of a multichannel authentication and tokenization system in accordance with some embodiments.
Figure 3B:
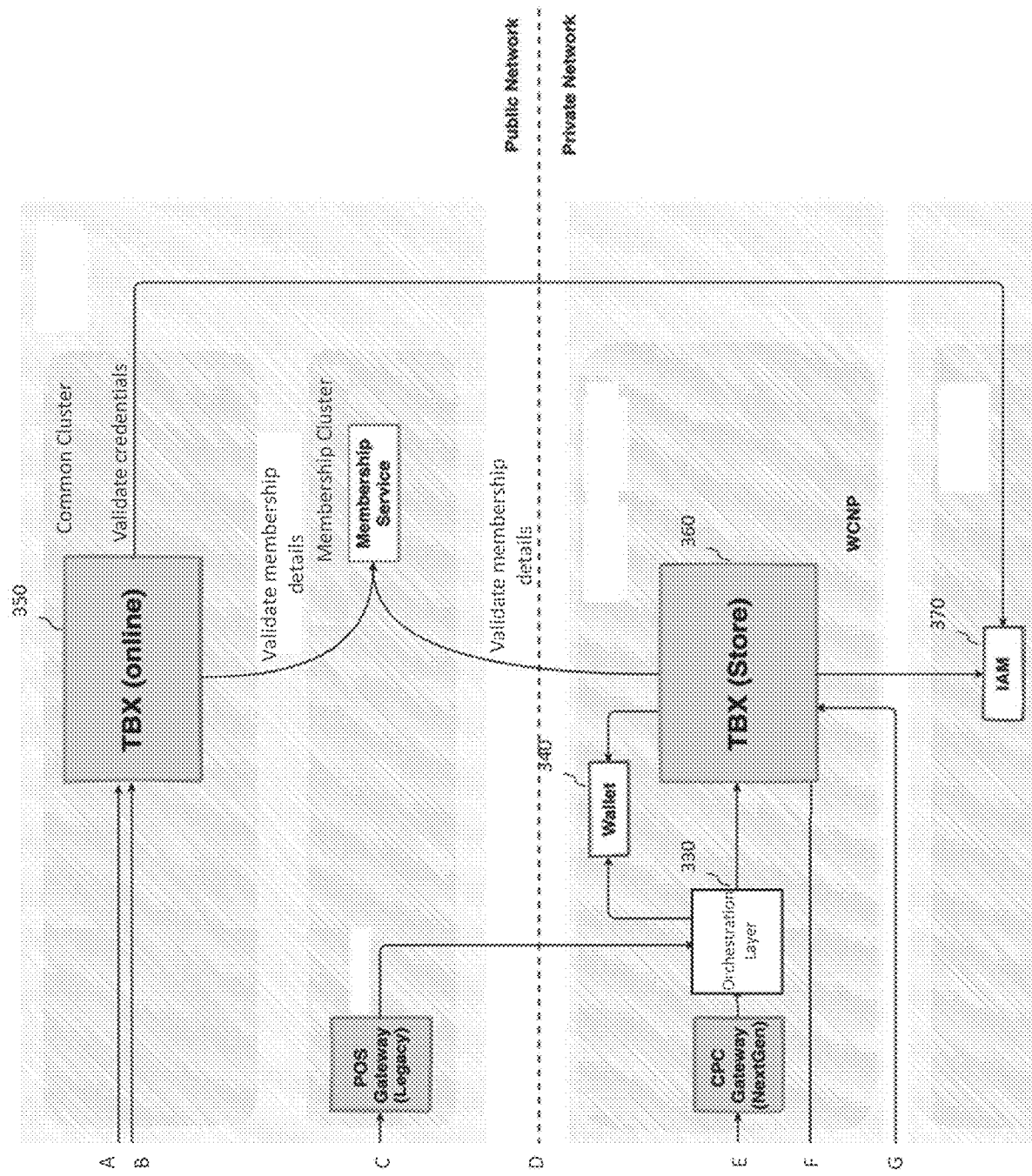

Referring now to FIGS. 3A and 3B, a system for multi-channel authentication and tokenization is shown. The system includes a public network portion that mainly supports digital channels and a private network portion that supports physical channels.

The public network portion includes an online backend 350 providing user interfaces of an e-commerce service (e.g. online store, shopping application, mobile checkout system, digital wallet) to user devices 311 accessing the e-commerce service via a desktop program, a website, and/or a mobile application. The user devices 311 communicate with the online backend 350 via a content distribution network ("CDN", e.g. Akamai Intelligent Edge Platform), a network accelerator (e.g. F5/Torbit), and an e-commerce authentication system 321 that implements an online authentication policy. The online backend 350 further provides user interfaces to user devices 312 at contact centers for providing customer service for customers. The user devices 312 communicate with the online backend 350 via a CDN, a network accelerator, and a contact center authentication system 322 that implements a contact center authentication policy.

The online backend 350 may be configured to receive customer credentials via the e-commerce authentication system 321 and the contact center authentication system 322, and validate the credentials with a user identity and authentication management ("IAM") system 370 storing user identity and credential information. In some embodiments, the online backend 350 may be configured to recognize tokens in the format of a shared tokenization protocol of the e-commerce authentication system 321, the contact center authentication system 322, and the POS authentication system 323. The e-commerce authentication system 321 and the contact center authentication system 322 may be configured to receive authentication of the user credentials from the IAM system 370 and generate tokens based on the tokenization protocol/service shared by the three authentication systems. The tokens generated based on the shared tokenization protocol may then be used for communications between user devices 311 and 312 and the online backend 350. In some embodiments, the online backend 350 may be configured to recognize only tokens provided by the IAM system 370. The e-commerce authentication system 321 and the contact center authentication system 322 may generate converted tokens based on their shared tokenization protocol and associate the converted tokens with the corresponding IAM tokens in a token conversion database. The contact center authentication system 322 and the e-commerce authentication system 321 may then use the IAM token for communications with the online backend 350 and use the token generated based on the shared tokenization protocol for communications with the user devices 311 and 312. In some embodiments, the online backend 350 is further configured to communicate with a membership service module for retrieving membership information for use in responding to calls from the user devices 311 and 312.

The private network portion includes a POS authentication system 323 that supports in-store POS terminals 313 and helpdesk terminals 314 in a store network. The store backend 360 communicates with the POS terminals 313 via one or more POS gateways and an orchestration layer 330 (e.g. Vivaldi). In some embodiments, the store backend 360 may further communicate with a mobile wallet system 340 for processing transactions using payment information associated with a customer and communicate with a membership service module for retrieving membership information for use in responding to calls from POS terminals 313 and helpdesk terminals 314. The store backend 360 may be configured to receive customer credentials from the store network and validate the credentials via the POS authentication system 323 and the IAM system 370.

In some embodiments, the store backend 360 may be configured to recognize the token generated based on the tokenization protocol of the POS authentication system 240. The POS authentication system 323 may generate tokens based on the tokenization protocol that is shared with the e-commerce authentication system 321 and the contact center authentication system 322. The tokens may then be transmitted back to the store network for use in subsequent calls to the store backend 360. In some embodiments, the store backend 360 may only recognize IAM tokens, and the POS authentication system 323 may be configured to convert a token provided by the IAM system 370 to a token based on the shared tokenization protocol and associated the two tokens in a token conversion database. The POS authentication system 323 may then use the token provided by the IAM for communications with the store backend 360 and use the token generated by based the shared tokenization protocol for communications with the store network. In some embodiments, the online backend is further configured to communicate with a membership service module for retrieving membership information for use in responding to calls from the user devices 311 and 312.

In some embodiments, systems and modules accessed by the online backend 350 and the store backend 360 such as the membership service, the IAM, a checkout system, a rewards system, a transactions records system, an inventory system, etc. may be configured to recognize and use tokens generated or converted via authentications performed by the e-commerce authentication system 321, the contact center authentication system 322, and the POS authentication system 323 without differentiation of the originating channel.

Generally speaking, pursuant to various embodiments, systems, devices, and methods are provided for access token conversion. In some embodiments, a system for access token conversion is provided. The system comprises a first application programming interface (API) backend using a first authentication service based on a first tokenization protocol and a second API backend using a second authentication service based on a second tokenization protocol. The second authentication service is configured to receive from, a user device, a call to the second API backend with a first token associated with the first authentication service, convert the first token to a first converted token based on the second tokenization protocol, and forward the first converted token to the user device for use in subsequent calls to the second API backend.

Generally, an authentication and tokenization system is configured to authenticate users based on credentials and allow access based on tokens. In some embodiments, a system may have multiple authentication services that coexist. For example, during the migration of a web service from a legacy authentication service to a new authentication service, various frontend and backend components and resources of the system may use different authentication services. A user that signed in with an authentication service may need to access a resource that expects tokens to be generated by another authentication service. Conventionally, when a mismatch of token an authentication service occurs, the user is required to log in again. For example, a keep-me-signed-in (KSMI) token from a legacy system would not be validated by the new authentication service, and the user would be required to sign in again prior to the token's actual expiration. In some embodiments, systems and methods described herein may convert the received token from one format to another on the user's behalf such that the user does not have to enter user credentials to log in and be authenticated again when accessing resources using a different authentication service. In some embodiments, with the token conversion in place, a user may be seamlessly transitioned back and forth between multiple authentication services used by resources the user accesses.

In some embodiments, the token conversion system describes herein provides a link between a legacy authentication service and a new authentication service by converting legacy tokens into the new access tokens in the format of the new authentication service. In some embodiments, the token conversion system would present the users with a valid legacy token from being logged out of the system when accessing a system resource using the new authentication service. In some embodiments, the token conversion system may further convert a token from the new authentication service to a legacy token for use with components and resources of the system that only recognizes legacy token.

In some embodiments, the token conversion system is configured to convert tokens between different authentication services based on the destination of a request/call. In some embodiments, a token link is provided as a hyperlink between source and destination systems. In some embodiments, the token conversion system ensures that the generated token is converted to a readable format for the destination system. In some embodiments, the token conversion system provides a common link that converts tokens based on the type of token, source system, and destination system. In some embodiments, the token conversion system may be configured to read through a token, validate the token, and convert it to a token of the destination type. In some embodiments, the token conversion system may further be configured to generate a response with links required for new token generation or validation. In some embodiments, the token conversion system may communicate with source and destination systems to generate the tokens to ensure that the generated tokens are reusable. In some embodiments, the token conversion system handles both fallback and rollback scenarios without impacting user experience.

In some embodiments, the token conversion system may be used for the migration of a site from one authentication service to another authentication service. If a site supports KSMI, a user who has logged into the site with a token from the legacy authentication service would be treated as a logged-in user even after the site has migrated to a new authentication service. The token conversion system converts the token from one format to another format in a secure way such that a token from the legacy system is honored by the new authentication service. And if a user lands in the old system, the token from the new authentication will be converted to a legacy token recognizable by the system accessed. In some embodiments, the token conversion system supports multiple channels, such as desktop, mobile web, and mobile applications (e.g. IOS, Android). In some embodiments, the token conversion system may be used for migration scenario (legacy to new), resiliency scenario (switch to the other if the current system is failing), and comparison scenario (AB test).

Figure 4:
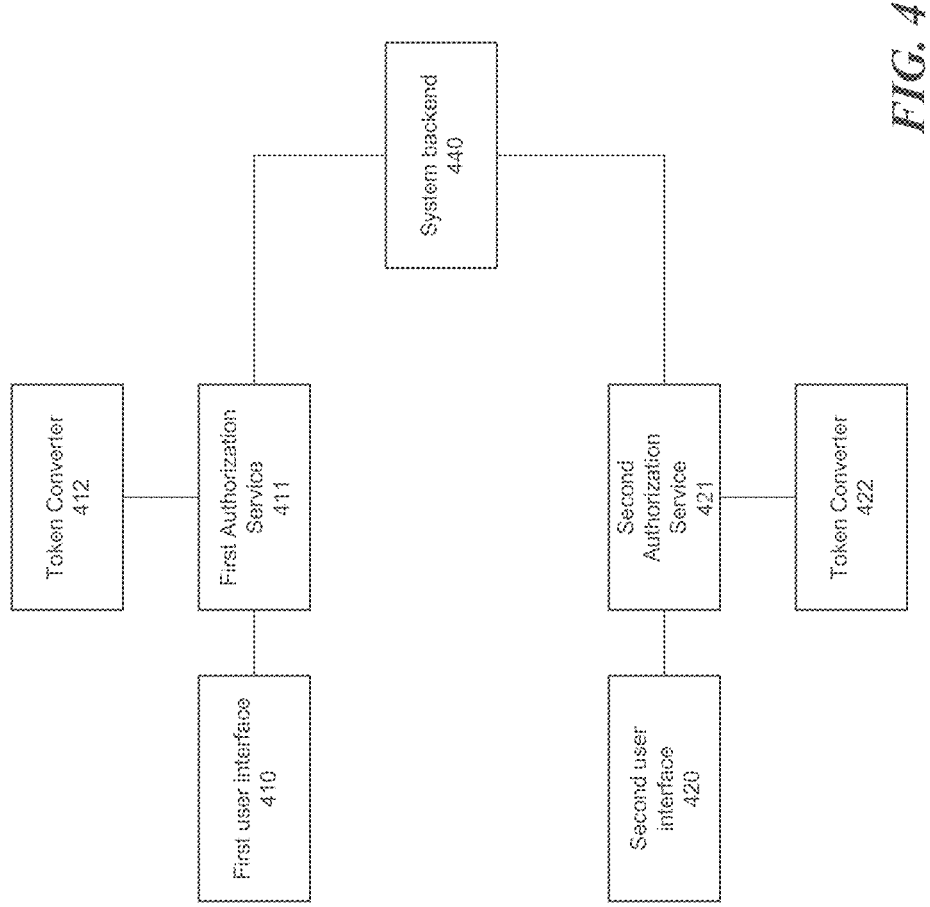
FIG. 4 comprises a block diagram of a token conversion system in accordance with some embodiments.

Referring now to FIG. 4, a system for access token conversion is shown. The system comprises a first user interface 410 coupled to the system backend 440 via a first authentication service 411 and a second user interface 420 coupled to the system backend 440 via a second authentication service 421. In some embodiments, the first authentication service 411 and the second authentication service 421 may be based on different tokenization protocols. For example, the first authentication service 411 may be a server-based authentications system such as the Oracle ATG authenticator, and the second authentication service 421 may be a cloud-based authentication service such as the Microsoft Azure B2C authenticator. In some embodiments, the first authentication may comprise a legacy authentication service and the second authentication service 421 may comprise a new authentication service during an authentication service migration. The first authentication service 411 is configured to authenticate user credentials and tokens received via the first user interface and the second authentication service 421 is configured to authenticate user credentials and tokens received via the second user interface. Both the first authentication service 411 and the second authentication service 421 are configured to generate tokens (e.g. KMSI tokens) based on their respective tokenization protocols and provide the tokens to user devices for subsequent access of the system backend 440.

The system backend 440 may comprise various services and components that are configured to provide and process information in response to calls received via the first user interface 410 and the second user interface 420 based on the received tokens. The first user interface 410 and the second user interface 420 may generally comprise websites or applications configured to provide content to users and receive user inputs. In some embodiments, the first user interface 410 and second user interface 420 may comprise user interfaces for physical retail (e.g. checkout terminal, self-service kiosk, customer service terminal) and/or e-commerce (e.g. online ordering system, online store, digital wallet), and the system backend 440 may comprise a retail backend system comprising systems for supporting in-store POS functionalities and/or e-commerce functionalities such as a checkout system, a membership service system, a digital wallet system, an order tracking system, a rewards system, etc. In some embodiments, the services and components of the system backend 440 may each be configured to recognize only tokens generated by the first authentication service 411, only tokens generated by the second authentication service 421, or both. In some embodiments, components of the system backend 440 that recognizes tokens based on the first authentication service's tokenization protocol may be collectively referred to as the first API backend. In some embodiments, services and components of the system backend 440 that recognizes tokens based on the second authentication service's tokenization protocol may be collectively referred to as the second API backend.

In some embodiments, when the system receives a call including a token via the first user interface 410 or the second user interface 420, the system may determine whether a token conversion is needed based on the source of the call (i.e. whether either of the systems is enabled), the token type (i.e. first or second authentication service format), and the destination of the call (i.e. token type recognized by the backend system called). An example set of actions taken under each scenario is shown in Table 1 below, using Azure as an example of a new authentication service and OneOPs as an example of a legacy authentication service. In some embodiments, the system may perform token conversion when there is a mismatch between the received token type and the token type recognized by the backend system being called.

In some embodiments, when the first authentication service 411 determines that token conversion is needed, the first authentication service 411 may forward the token and/or associated user credential to the token converter 412. In some embodiments, if the token received is associated with the second authentication service 421 and need to be converted to a token in the format of the first authentication service 411, the token converter 412 may generate a converted token using the first authentication service 411, associate the converted token with the received token, and forward the converted token to the requesting user device for use in subsequent communications with the system backend 440. In some embodiments, if the token received is associated with the first authentication service 411, the token converter 412 may send the user credential to the second authentication service 421 to generate a token based on the protocol of the second authentication service 421 and associate with the received token with the converted token from the second authentication service 421. In some embodiments, the token converter 422 may perform similar functions for tokens received via the second user interface 420.

While two authentication services and two user interfaces are shown in FIG. 4, in some embodiments, the system may include two or more authentication services with different token types, and the token converters may be configured to convert between each of the authentication services in the network.

Referring now to FIG. 5, a method for providing access token conversion is shown. In some embodiments, the steps shown in FIG. 5 may be performed by a processor-based device such as a control circuit executing a set of computer-readable instructions stored on a computer-readable memory. In some embodiments, one or more steps of FIG. 2 may be performed by the systems described with reference to FIG. 4 and FIGS. 7A-B, and/or the computer system described with reference to FIG. 8.

In some embodiments, the steps in FIG. 5 are performed in a system including a first application programming interface (API) backend using a first authentication service based on a first tokenization protocol and a second API backend using a second authentication service based on a second tokenization protocol. In some embodiments, the two authentication services may include a legacy authentication service and a newly added authentication service based on different tokenization protocols. In some embodiments, the two authentication services may comprise a cloud-based authenticator and a server-based authenticator.

In step 510, the system receives a call to an API backend at an authentication service. In some embodiments, the call may be received via a user interface (e.g. webpage, mobile application) providing e-commerce or in-store retail functionalities. In some embodiments, the API backend may be configured to recognize tokens from one of the two authentication services. In step 511, an authentication service determines whether a valid access token is associated with the call. If an access token is not present, is expired, or is not associated with any of the authentication services in the overall system, in step 520, the user is redirected to a log-in page to create a new account or sign in to an existing account by providing user login credential. In step 521, the system generates an access token for the user information and/or credential entered via the log-in page. In step 523, the generated token is forwarded to the user device for use in subsequent communications with the system, such as a call to the API backend.

If, in step 511, a valid token for either the first or second authentication is detected, in step 513, the system determines the authentication service associated with the token. In step 514, the system determines whether token conversion should be performed for the received token. In some embodiments, step 514 may be based on the source of the call (i.e. user interface associated with first or second authentication service), the token type (i.e. first or second authentication protocol), and the token type recognized by the backend system called. An example set of actions taken under each scenario according to some embodiments is shown in Table 1 below. In some embodiments, the system may perform token conversion when there is a mismatch between the received token type and the token type recognized by the API backend being called.

If the token does not need to be converted, in step 530, the system forwards the call and the token to the API backend which may, in turn, respond to the call by using the token to retrieve user information. If token conversion is needed, the token is converted into a converted token in step 515. In some embodiments, if the token received in step 510 is associated with an authentication service different from the one performing the authentication, the token converter may generate a converted token based on the associated authentication service, and associate the converted token with the received token or the user information associated with the received token in a token conversion database. In some embodiments, if the token received is associated with the authentication service performing the authentication, the token converter may send the user credential or the received token to the other authentication service to generate a converted token based on the protocol of the other authentication service. In some embodiments, the association between the converted token and the received token and/or the user information associated with the received token may be stored in a tokenization database accessible by one or both of the tokenization services. In some embodiments, the converted token may inherit properties (e.g. expiration date, step-up tier) of the original token. In step 516, the system forwards the converted token to the user device for use in subsequent communications with the system. In some embodiments, the converted token may replace the original token on the user device. In some embodiments, a user device may simultaneously store the original token and the converted token and include one or both tokens in subsequent calls to the system. After the token is converted to a format recognized by the API backend being called, in step 530, the call and the token are forwarded to the API backend which may, in turn, respond to the call by using the converted token to retrieve user information. In some embodiments, the authentication service may use the first token of its own tokenization protocol for communications with user devices via the user interface and use a second token in the format of another authentication service/protocol for communications with the system backend. When the authentication service receives a call with the first token, it validates the first token and replaces the second token prior to forwarding the call to the backend.

In some embodiments, a system may simultaneously execute multiple instances of the steps shown in FIG. 5 to perform authentication and token conversion for a plurality of calls from a plurality of user interface devices. In some embodiments, the system may execute a similar process for calls to the other API backends in the overall system that uses a different (e.g. third) authentication service based on a different tokenization protocol.

Figure 6A:
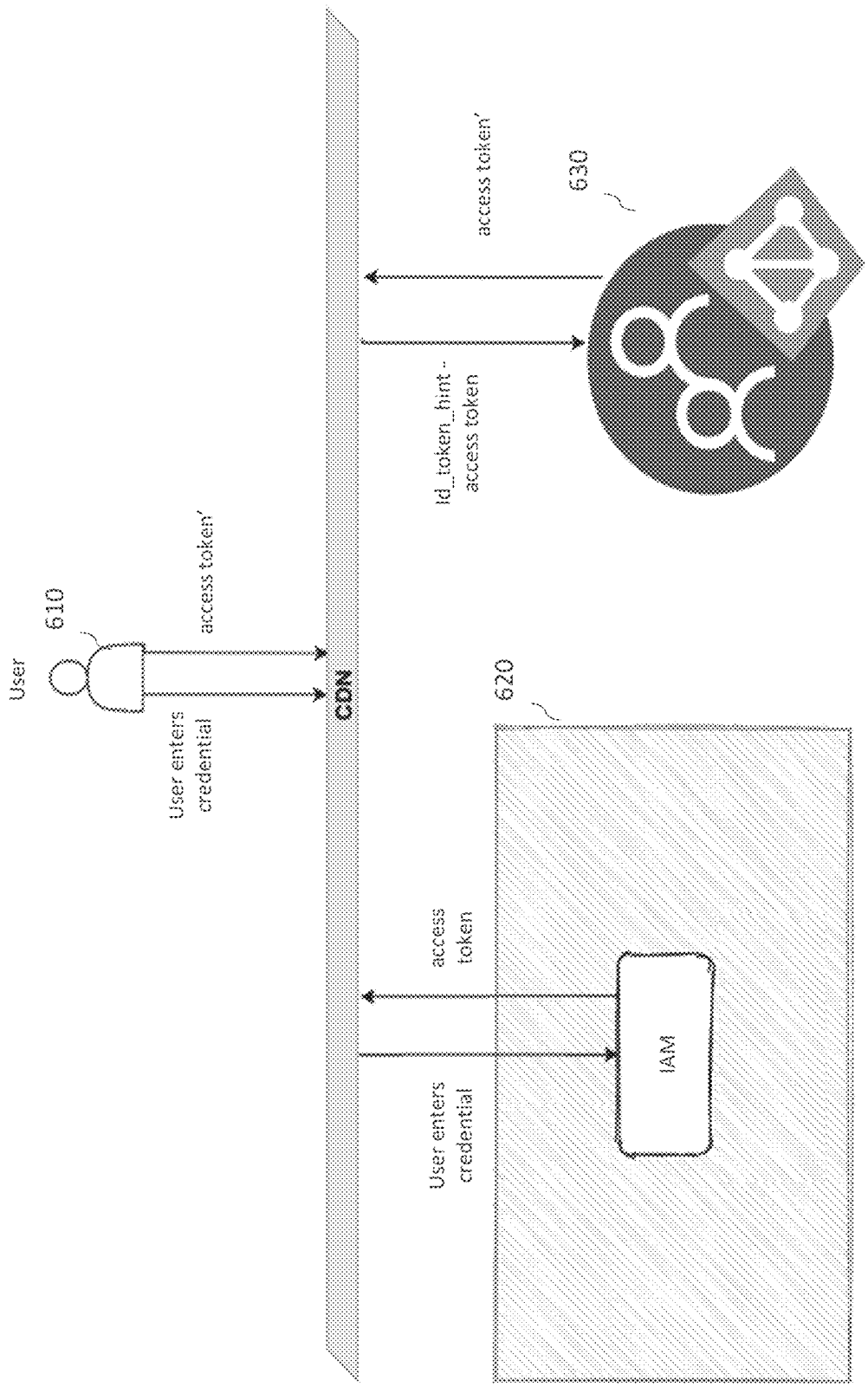
FIGS. 6A and 6B comprises illustrations of token conversion in accordance with some embodiments.
Figure 6B:
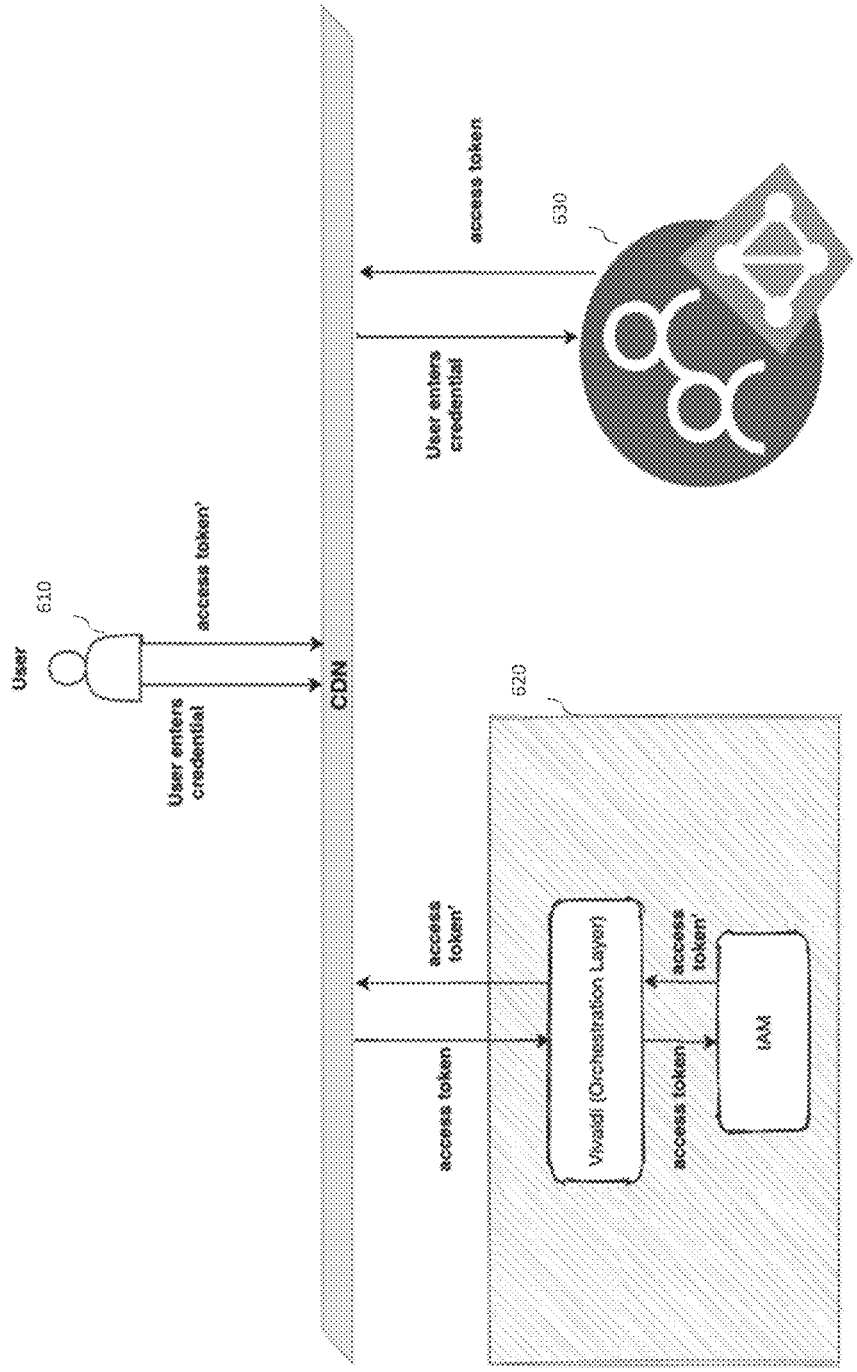

Next referring to FIGS. 6A and 6B, illustrations of two-way access token conversion are shown. In FIG. 6A, the user 610 enters, via a CDN, user credential that is received at a first identity provider 620 including an identity and authentication management ("IAM") system. The identity provider 620 validates the credential and generates an access token associated with the user credential. When the second identity system 630 receives the access token, it associates the access token with a converted token generated based on the tokenization protocol of the second identity system 630. The converted access token is then forwarded to and stored by the user device and included in subsequent calls via the CDN. In FIG. 6B, the user enters, via a CDN, the user credential that is received at the second identity system 630. The second identity system 630 validates the credential and generates an access token associated with the user credential. When the access token from the second identity system 630 is received at the first identity provider 620, the first identity provider 620 uses an orchestration layer (e.g. Vivaldi) to validate the token. In some embodiments, the first identity provider 620 associates the access token with a converted token generated based on its tokenization protocol. In some embodiments, the first identity provider 620 may first retrieve the user credential associated with the access token and associate the user credential with a converted token generated based on its tokenization protocol.

In some embodiments, actions taken in scenarios that occur in a system with two authentication services are shown below in Table 1. In Table 1, Azure is used as an example of a new authentication service and OneOPs is used as an example of a legacy authentication service. However, the systems and methods described herein may be implemented based on any combination of authentication and/or identity provider systems and services. In some embodiments, whether a token received with a call to a backend requires conversion is determined based on the backend being called (column 1), the source of the call (column 2), and the access token type (column 3). In some embodiments, whether B2C is enabled may be determined based on whether a cookie is enabled or disabled at the source of the call.

TABLE 1

| API Backend Called | B2C enabled | Access Token Type | Actions |
| --- | --- | --- | --- |
| Azure | yes | B2C | 1. JS detect B2C token. 2. Validate/Refresh if required 3. BE will use B2C token |
| Azure | yes | OneOps | 1. JS detects OOPs token. 2. Exchange OOPs token to B2C token using Token converter 3. BE will use B2C token |
| Azure | yes | None | Redirect the user to B2C Login Page |
| Azure | no | B2C | 1. JS detects B2C token and NeP B2C cookie disabled. 2. Orchestration layer detects B2C token and NeP B2C cookie disabled. 3. Vivaldi calls Login service in OOPs to convert B2C token to OOPs token. 4. BE will use OOPs token |
| Azure | no | OneOps | 1. JS detects OOPs token and NeP B2C cookie disabled 2. FE will use OOPs token for BE calls 3. BE SCAL Lib will validate/refresh the token |
| Azure | no | None | Redirect the user to OOPS Login Page |
| OneOps | yes | B2C | 1. Back End (Login service, Vivaldi, ATG) will understand B2C token 2. If B2C token has expired then BE will return 401 3. UI will redirect to Login page in case of 401 |
| OneOps | yes | OneOps | Use OOPs token for BE calls |
| OneOps | yes | None | Redirect to react/B2C login page based on NeP B2C Cookie |
| OneOps | no | B2C | 1. Vivaldi detects B2C token 2. Vivaldi calls Login service in OOPs to convert B2C token to OOPs token. 3. BE will use OOPs token |
| OneOps | no | OneOps | Back End to use OOPs token |
| OneOps | no | None | Redirect to react login page |

Table 1 is provided as an example only. In some embodiments, whether token conversion is triggered at an authentication system may be based on various criteria and scenarios based on system step up.

Figure 7A:
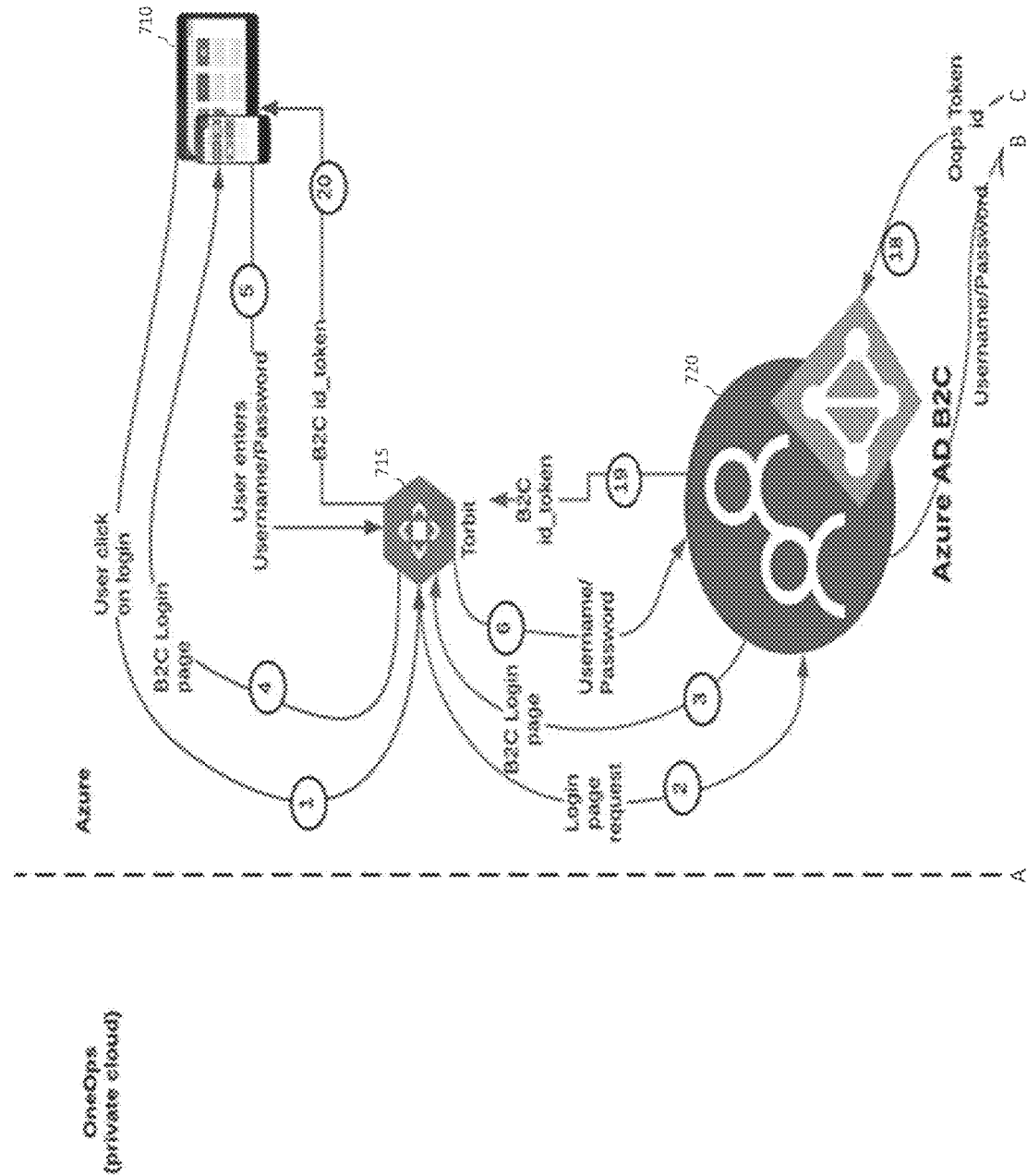
FIGS. 7A and 7B comprises a flow diagram of a sign-in process in accordance with some embodiments.
Figure 7B:
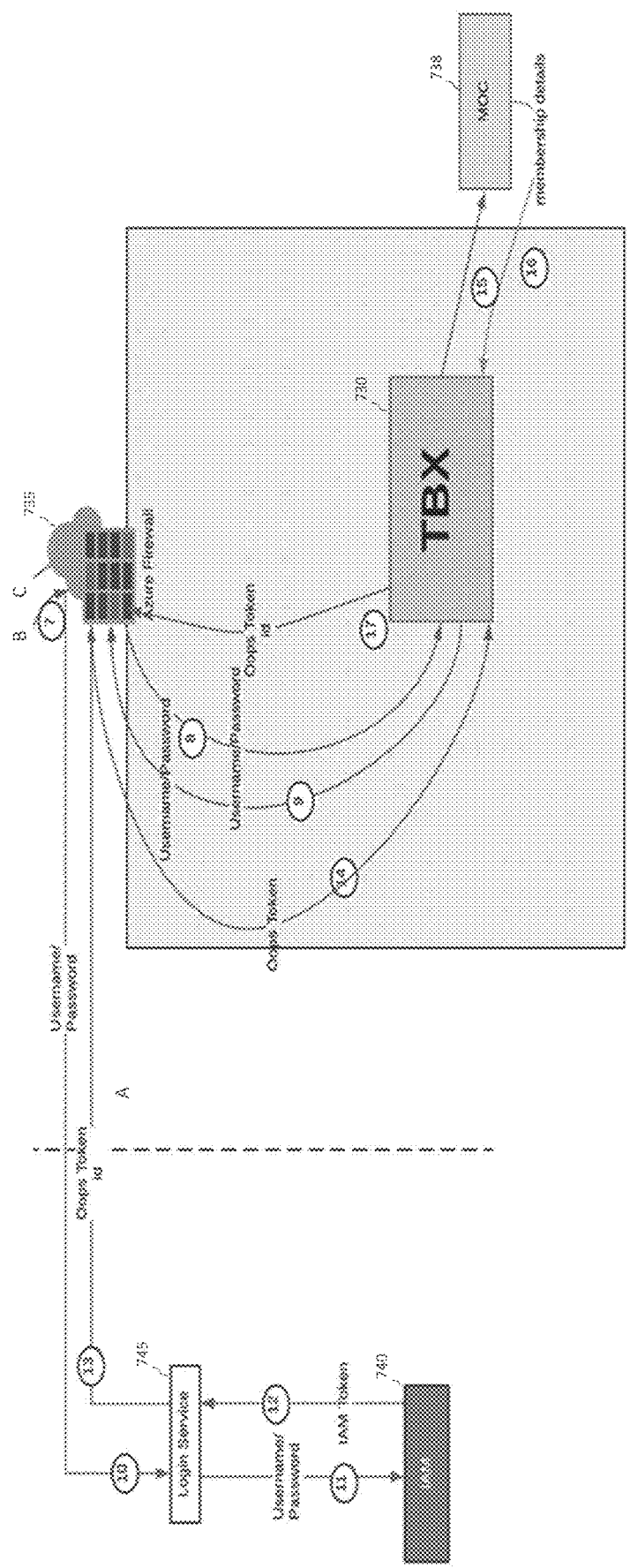

Next referring to FIGS. 7A and 7B, a sign-in flow according to some embodiments is shown. In FIGS. 7A-B, Azure is used as an example of a new authentication service and OneOPs is used as an example of a legacy authentication service. However, the systems and methods described herein may be implemented based on any combination of authentication and/or identity provider systems. The system in FIGS. 7A-B includes a user device 710 accessing a user interface, a web accelerator 715 (e.g. Torbit), an authentication service 720 (e.g. Azure AD B2C), a firewall 735 (e.g. Azure firewall), a backend toolbox 730, a membership service 738, a login service 745, and an IAM system 740.

In step 1, the user clicks on login to access the content of the user interface. In step 2, the login request is forwarded from the accelerator 715 to the authentication service 720. In step 3, a B2C login page for the authentication service 720 is provided to the accelerator 715. In step 4, the accelerator forwards the login page to the user device. In step 5, the user enters username and password via the login page. In step 6, the username and password are forwarded to the authentication service 720. In steps 7 and 8, the username and password are forwarded toward the backend toolbox 730 on a private network via a firewall 735. In steps 9 and 10, the backend toolbox 730 sends the username and password to the login service 745 via the firewall 735. In step 11, the username and password are forwarded to the IAM system 740 for authentication. In step 12, upon credential authentication, the IAM system 740 generates an IAM token for the login service 745. In steps 13 and 14, the login service 745 provides a OneOps token ID to the backend toolbox 730 via the firewall 735. In step 15, the backend toolbox 730 uses the OneOps token to query other components and services such as the membership service 738. In step 16, the membership service 738 provides membership details to the backend toolbox 730 based on the token. In steps 17 and 18, the backend toolbox 730 sends the OneOps token ID to the authentication service 720. In steps 19 and 20, the authentication service sends a B2C Id token associated with the OneOps token to the user device via the accelerator 715. The user device 710 may then use the B2C token for subsequent calls to the backend. For example, the user device may send the B2C token to the authentication service 720. The authentication service 720 may then send the OneOP token ID corresponding to the received B2C token to the backend for use in responding to the call.

Figure 8:
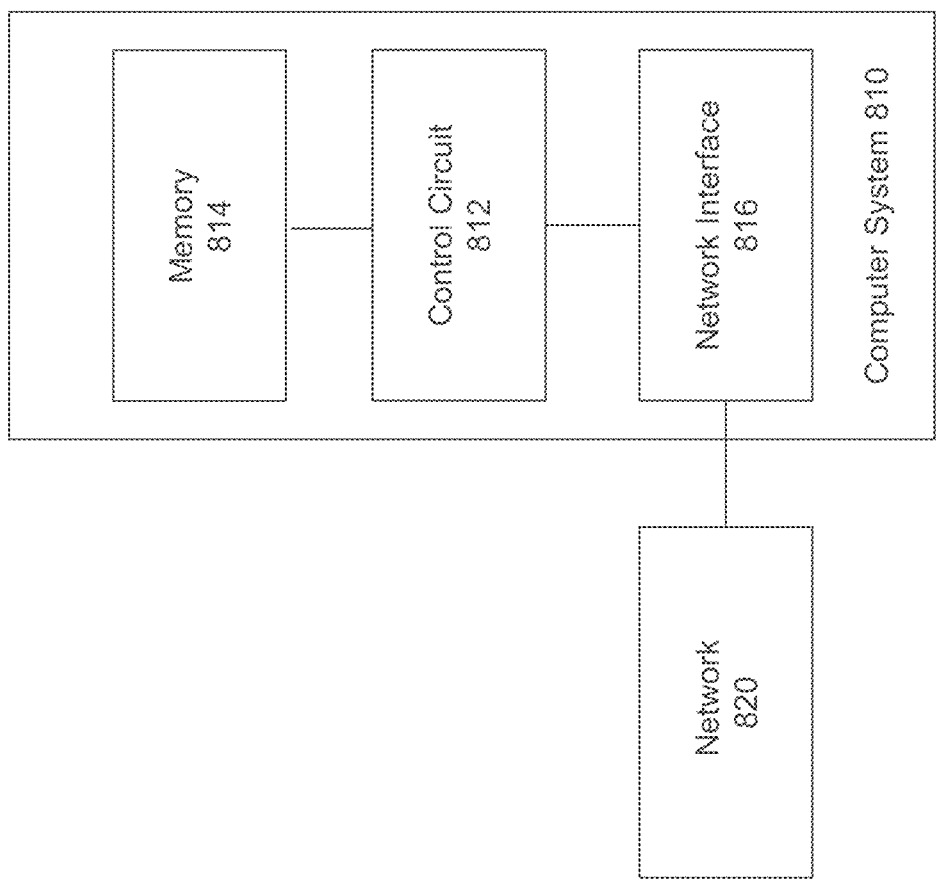
FIG. 8 comprises a block diagram of a computer system in accordance with some embodiments.

Referring now to FIG. 8, a computer system for access authentication and tokenization is shown. In some embodiments, the computer system 810 may be used to implement one or more systems, devices, components, and/or modules described herein. For example, in some embodiments, the computer system 810 may implement one or more components described with references to FIG. 1, FIGS. 3A-B, FIG. 4, FIG. 6A, FIG. 6B, and FIGS. 7A-B. In some embodiments, the one or more components described with references to FIG. 1, FIGS. 3A-B, FIG. 4, FIG. 6A, FIG. 6B, and FIGS. 7A-B may be implemented on one or more clusters of computing devices comprising the computer system 810.

The computer system 810 comprises a control circuit 812, a memory 814, and a network interface device 816. The control circuit 812 may comprise a processor, a microprocessor, a central processing unit (CPU), a graphics processing unit (GPU), an application-specific integrated circuit (ASIC), and the like and may be configured to execute computer-readable instructions stored on a computer-readable storage memory 814. The computer-readable storage memory 814 may comprise volatile and/or non-volatile memory and have stored upon it, a set of computer-readable instructions which, when executed by the control circuit 812, causes the computer system 810 to provide one or more functionalities described herein, such as access authentication, tokenization, and/or API backend services. In some embodiments, the computer-executable instructions may cause the control circuit 812 of the computer system 810 to perform one or more steps described with reference to FIG. 2, FIG. 5, and FIGS. 7A-B herein. In some embodiments, the computer-executable instructions may cause the control circuit 812 of the computer system 810 to provide other functionalities for supporting e-commerce and/or in-store retail operations. In some embodiments, the memory 814 may further store one or more of the databases for supporting these functionalities such as a user identity database, a membership information database, a tokenization database, a token conversion database, etc.

The network interface device 816 may comprise a data port, a wired or wireless network adapter, and the like. In some embodiments, the computer system 810 may communicate with other components of the system, user devices, and/or a store network via the network interface device 816 over a network 820 such as a local network, a private network, or the Internet. In some embodiments, computer system 810 may further include user input/output devices such as a keyboard, a mouse, a touch screen, a display screen, a VR/AR display device, a speaker, a microphone, etc. for configuring and monitoring the processed executed by the computer system 810.

In one embodiment, a system for multichannel authentication is provided. The system comprises a first authentication system serving a plurality of in-store point of sale terminals and implementing a physical channel authentication policy and a second authentication system serving a plurality of user devices accessing an e-commerce service and implementing an e-commerce channel authentication policy, and a tokenization system. The tokenization system being configured to generate a first token in response to receiving a first user credential from an in-store point of sale terminal via the first authentication system, generate a second token in response to receiving a second user credential from a user device via the second authentication system, and forward the first token and the second token to the retailer backend system, wherein the first token and the second token are generated based on a same tokenization protocol.

In one embodiment, a method for multichannel authentication is provided. The method comprises generating, with a tokenization system, a first token in response to receiving a first user credential from an in-store point of sale terminal via a first authentication system serving a plurality of in-store point of sale terminals and implementing a physical channel authentication policy, generating, with a tokenization system, a second token in response to receiving a second user credential from a user device via aa second authentication system serving a plurality of user devices accessing an e-commerce service and implementing an e-commerce channel authentication policy, and, forwarding the first token and the second token to a retailer backend system, wherein the first token and the second token are generated based on a same tokenization protocol.

In one embodiment, an apparatus for multichannel authentication is provided. The apparatus comprises a non-transitory storage medium storing a set of computer-readable instructions, and a control circuit configured to execute the set of computer-readable instructions which cause the control circuit to generate, with a tokenization system, a first token in response to receiving a first user credential from an in-store point of sale terminal via a first authentication system serving a plurality of in-store point of sale terminals and implementing a physical channel authentication policy, generate, with a tokenization system, a second token in response to receiving a second user credential from a user device via a second authentication system serving a plurality of user devices accessing an e-commerce service and implementing an e-commerce channel authentication policy, and forward the first token and the second token to a retailer backend system, wherein the first token and the second token are generated based on a same tokenization protocol.

In one embodiment, a system for access token conversion is provided. The system comprises a first application programming interface (API) backend using a first authentication service based on a first tokenization protocol and a second API backend using a second authentication service based on a second tokenization protocol. The second authentication service is configured to receive from, a user device, a call to the second API backend with a first token associated with the first authentication service, convert the first token to a first converted token based on the second tokenization protocol, and forward the first converted token to the user device for use in subsequent calls to the second API backend.

In one embodiment, a method for access token conversion is provided. The method comprises providing, to a user device, a first token from a first application programming interface (API) backend using a first authentication service based on a first tokenization protocol, receiving, from the user device, a call to a second API backend with the first token, the second API backend using a second authentication service based on a second tokenization protocol, converting, with the second authentication service, the first token to a first converted token based on the second tokenization protocol, and forwarding the first converted token to the user device for use in subsequent calls to the second API backend.

In one embodiment, an apparatus for access token conversion, the apparatus comprises a non-transitory storage medium storing a set of computer-readable instructions and a control circuit configured to execute the set of computer-readable instructions which cause the control circuit to provide, to a user device, a first token from a first application programming interface (API) backend using a first authentication service based on a first tokenization protocol, receive, from the user device, a call to a second API backend with the first token, the second API backend using a second authentication service based on a second tokenization protocol, convert the first token to a first converted token based on the second tokenization protocol, and forward the first converted token to the user device for use in subsequent calls to the second API backend.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for authentication token conversion comprising:
   a non-transitory storage medium storing a set of computer-readable instructions; and
   a control circuit configured to execute the computer-readable instructions which cause the control circuit to:
   receive a first call from a first application programming interface (API) backend using a first authentication service based on a first tokenization protocol, the first authentication service being configured to:
   serve a plurality of in-store point of sale terminals; and
   implement a physical channel authentication policy, wherein the physical channel authentication policy includes requirements for one or more tiers of step-up authentication;
   receive, from a user device, a second call to a second API backend with a first token associated with the first authentication service, wherein the second API backend uses a second authentication service based on a second tokenization protocol, the second authentication service being configured to:
   serve a plurality of user devices accessing an e-commerce service; and
   implement an e-commerce channel authentication policy wherein the e-commerce channel authentication policy includes requirements for one or more tiers of step-up authentication;
   convert the first token to a first converted token based on the second tokenization protocol;
   determine whether the first converted token is associated with a valid session initiated through the first authentication service;
   permit access to the second API backend based upon the determination that the first converted token is associated with the valid session initiated through the first authentication service;
   store, in a token mapping database, an association between the first token, first converted token, and session data;
   apply a token validity period to the first converted token, wherein the token validity period is a predefined timeout period;
   forward the first converted token to the user device for use in subsequent calls to the second API backend; and
   in response to an expiration of the predefined timeout period, or termination of the session, revoke the first converted token.

2. The system of claim 1, wherein the first token is a stay-signed-in (KMSI) token for accessing a website.

3. The system of claim 1, wherein the first authentication service and the second authentication service validate user credentials based on a same user credential database.

4. The system of claim 1, wherein the second API backend is configured to:
   receive a second token associated with the second tokenization protocol in a second call; and
   respond to the second call based on the second token.

5. The system of claim 1, wherein the second authentication service is further configured to determine whether to convert a received token based on whether the first API backend is called or the second API backend is called, and whether the received token is associated with the first authentication service or the second authentication service.

6. The system of claim 1, wherein the first authentication service is configured to:
   receive a call, from a second user device, to the first API backend with a second token associated with the second authentication service;
   convert the second token to a second converted token based on the first tokenization protocol; and
   forward the second converted token to the second user device for use in subsequent calls to the second API backend.

7. The system of claim 1, wherein the first authentication service is further configured to:
   determine whether the second tokenization protocol is recognized at the first API backend;
   receive a call to the first API backend with a second token associated with the second authentication service; and
   authenticate the second token with the second authentication service in response to the second tokenization protocol being recognized at the first API backend, wherein the first API backend responds to the call based on the second token.

8. The system of claim 1, wherein an association between the first token and the first converted token is stored in a token conversion database.

9. The system of claim 1, wherein the second authentication service is further configured to determine whether the first token has expired prior to converting the first token to the first converted token.

10. The system of claim 1, wherein the second authentication service is further configured to:
    receive a second call without a token or with an expired token; and
    redirect the second call to a login page.

11. A method for authentication token conversion, the method comprises:
    providing, to a user device, a first token from a first application programming interface (API) backend using a first authentication service based on a first tokenization protocol, wherein the first authentication service is configured to:
    serve a plurality of in-store point of sale terminals; and
    implement a physical channel authentication policy, wherein the physical channel authentication policy includes requirements for one or more tiers of step-up authentication;
    receiving, from the user device, a call to a second API backend with the first token, the second API backend using a second authentication service based on a second tokenization protocol, wherein the second authentication service is configured to:
    serve a plurality of user devices accessing an e-commerce service; and
    implement an e-commerce channel authentication policy wherein the e-commerce channel authentication policy includes requirements for one or more tiers of step-up authentication;
    converting, with the second authentication service, the first token to a first converted token based on the second tokenization protocol;

determining whether the first converted token is associated with a valid session initiated through the first authentication service;

permitting access to the second API backend based upon the determination that the first converted token is associated with the valid session initiated through the first authentication service;

storing, in a token mapping database, an association between the first token, first converted token, and session data;

applying a token validity period to the first converted token, wherein the token validity period is a predefined timeout period;

forwarding the first converted token to the user device for use in subsequent calls to the second API backend; and in response to an expiration of the predefined timeout period, or termination of the session, revoke the first converted token.

12. The method of claim 11, wherein the first token is a stay-signed-in (KMSI) token for accessing a website.

13. The method of claim 11, wherein the first authentication service and the second authentication service validate user credentials based on a same user credential database.

14. The method of claim 11, further comprising:
receiving, at the second authentication service, a second token associated with the second tokenization protocol in a second call; and
responding, with the second API backend, to the second call based on the second token.

15. The method of claim 11, wherein the second authentication service is further configured to determine whether to convert a received token based on whether the first API backend is called or the second API backend is called, and whether the received token is associated with the first authentication service or the second authentication service.

16. The method of claim 11, further comprising:
receiving a call, at the first authentication service and from a second user device, to the first API backend with a second token associated with the second authentication service;
converting, with the first authentication service, the second token to a second converted token based on the first tokenization protocol; and
forwarding the second converted token to the second user device for use in subsequent calls to the second API backend.

17. The method of claim 11, further comprising:
determining whether the second tokenization protocol is recognized at the first API backend;
receiving a call to the first API backend with a second token associated with the second authentication service; and
authenticating the second token with the second authentication service in response to the second tokenization protocol being recognized at the first API backend, wherein the first API backend responds to the call based on the second token.

18. The method of claim 11, wherein an association between the first token and the first converted token is stored in a token conversion database.

19. The method of claim 11, wherein the second authentication service is further configured to determine whether the first token has expired prior to converting the first token to the first converted token.

20. A non-transitory storage medium storing a set of computer-readable instructions, which when executed by a control circuit configured to execute the set of computer-readable instructions, cause the control circuit to:
receive a first call from a first application programming interface (API) backend using a first authentication service based on a first tokenization protocol, wherein the first authentication service is configured to:
serve a plurality of in-store point of sale terminals; and
implement a physical channel authentication policy, wherein the physical channel authentication policy includes requirements for one or more tiers of step-up authentication;
receive, from a user device, a second call to a second API backend with the first token, wherein the second API backend uses a second authentication service based on a second tokenization protocol, wherein the second authentication service is configured to:
serve a plurality of user devices accessing an e-commerce service; and
implement an e-commerce channel authentication policy wherein the e-commerce channel authentication policy includes requirements for one or more tiers of step-up authentication;
convert the first token to a first converted token based on the second tokenization protocol;
determine whether the first converted token is associated with a valid session initiated through the first authentication service prior to permitting access to the second API backend;
store, in a token mapping database, an association between the first token, first converted token, and session data;
apply a token validity period to the first converted token, wherein the token validity period is a predefined timeout period;
forward the first converted token to the user device for use in subsequent calls to the second API backend;
in response to an expiration of the predefined timeout period, or termination of the session, revoke the first converted token.

* * * * *